Sept. 16, 1947.    F. RIEBER    2,427,421
APPARATUS AND METHOD FOR MAKING AND ANALYZING GEOPHYSICAL RECORDS
Filed June 22, 1940    6 Sheets-Sheet 1
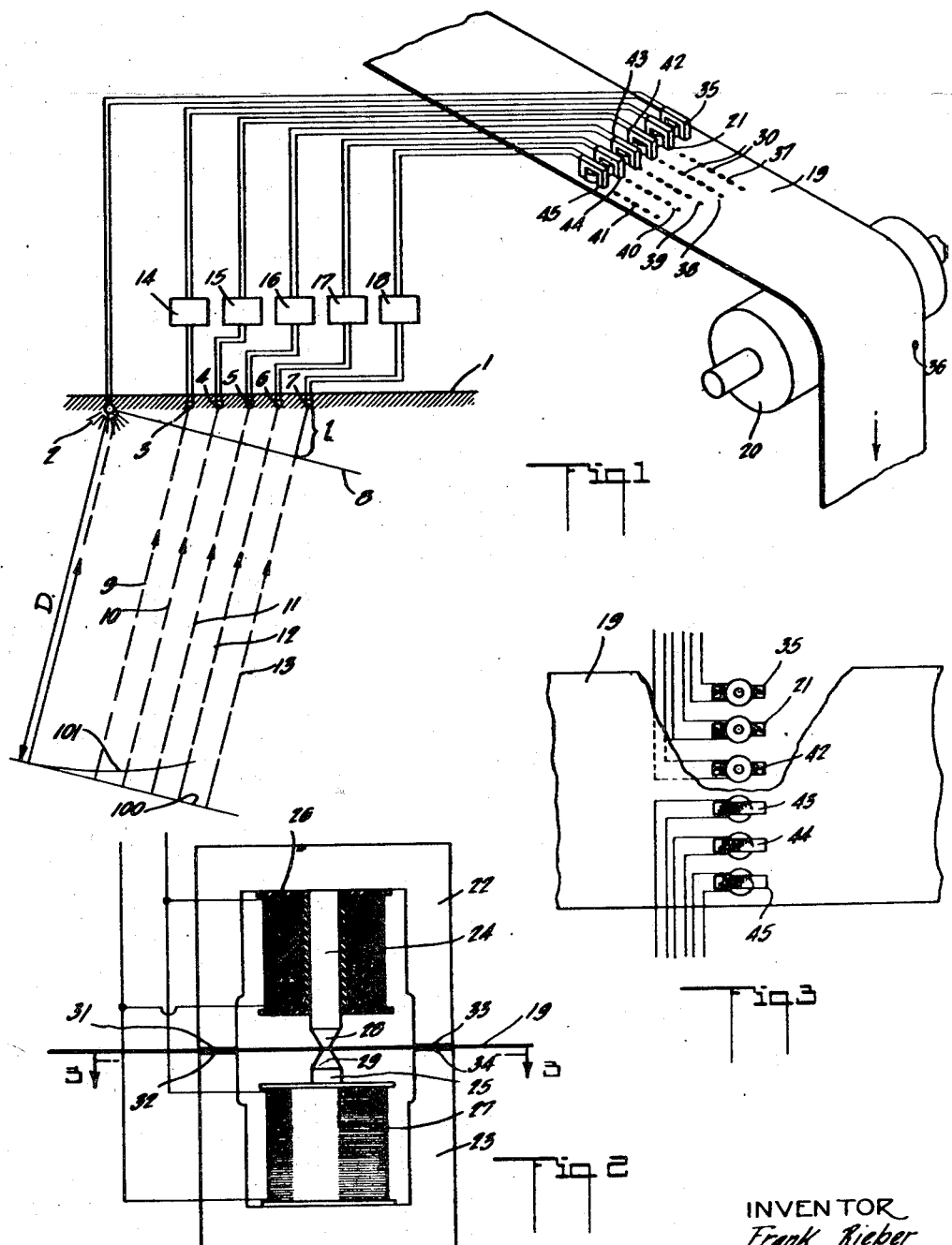
INVENTOR
Frank Rieber
BY John Flam
ATTORNEY

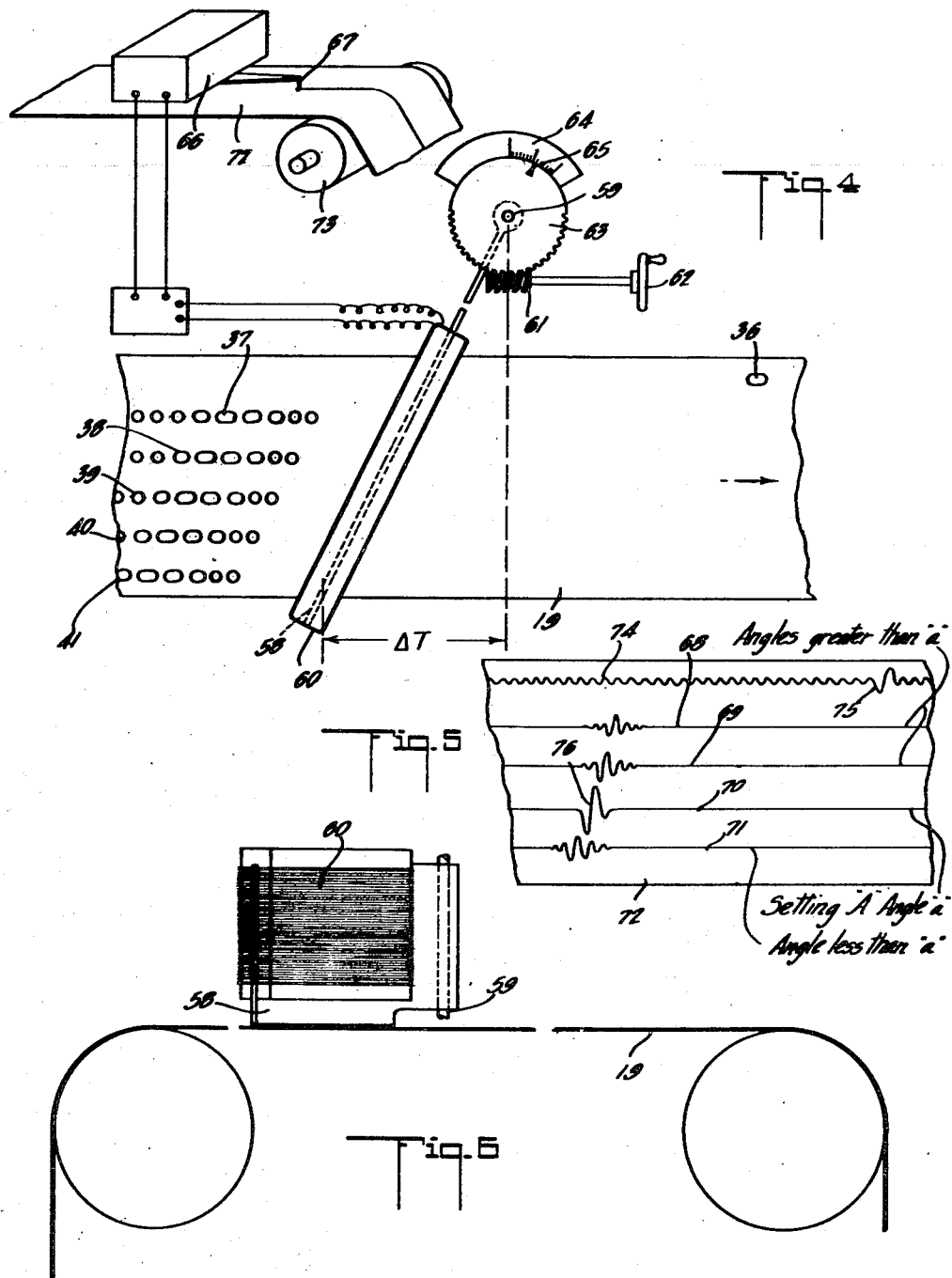

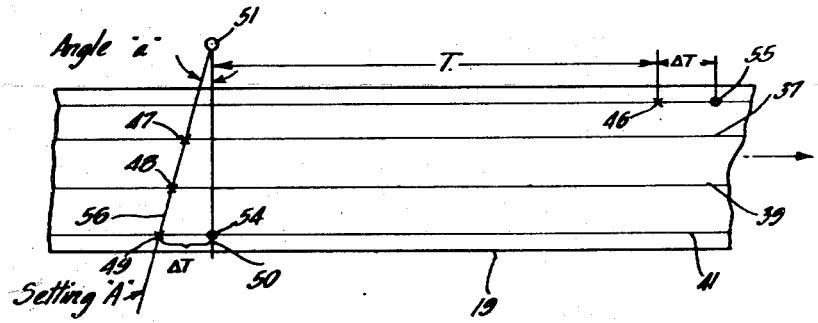

INVENTOR
Frank Rieber
BY John Flam
ATTORNEY

Sept. 16, 1947.   F. RIEBER   2,427,421
APPARATUS AND METHOD FOR MAKING AND ANALYZING GEOPHYSICAL RECORDS
Filed June 22, 1940   6 Sheets-Sheet 5
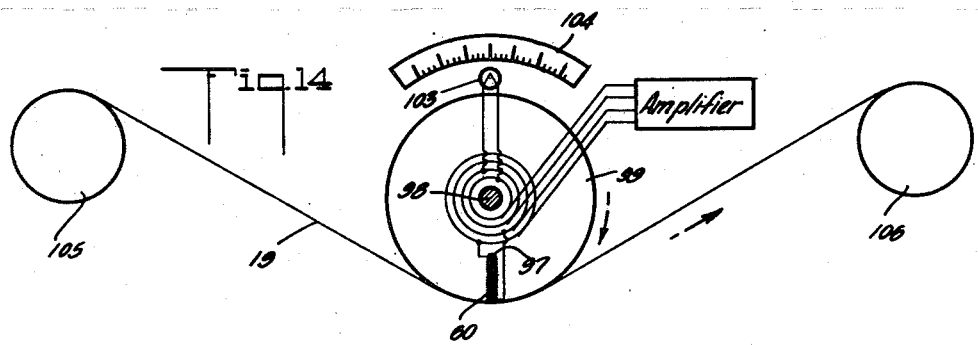
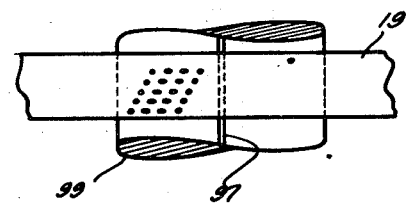
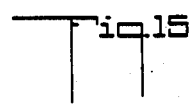
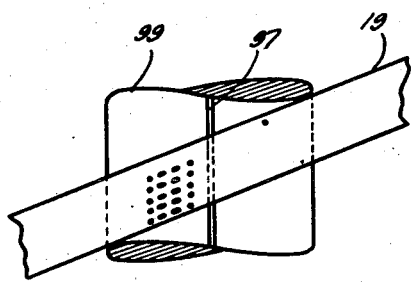
INVENTOR
Frank Rieber
BY John Flam
ATTORNEY Sept. 16, 1947. F. RIEBER 2,427,421
APPARATUS AND METHOD FOR MAKING AND ANALYZING GEOPHYSICAL RECORDS
Filed June 22, 1940 6 Sheets-Sheet 6
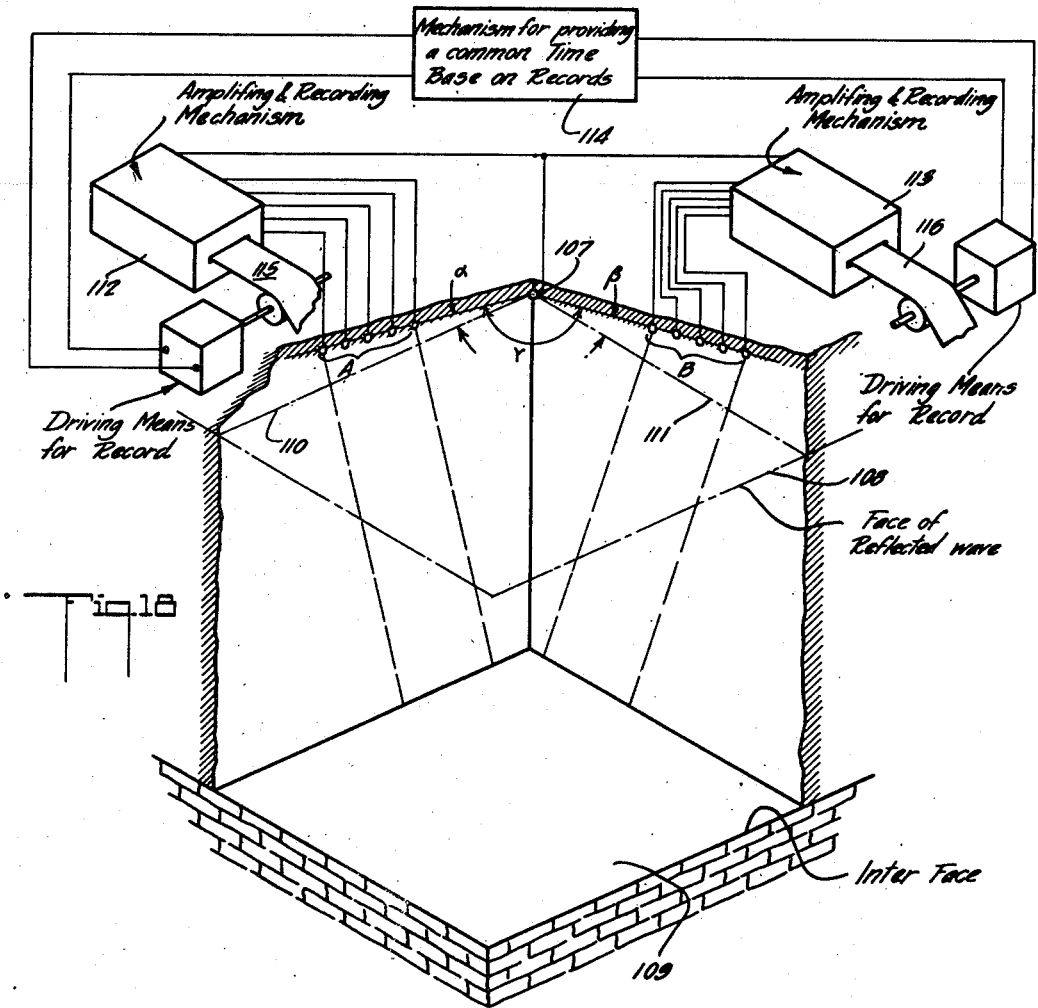
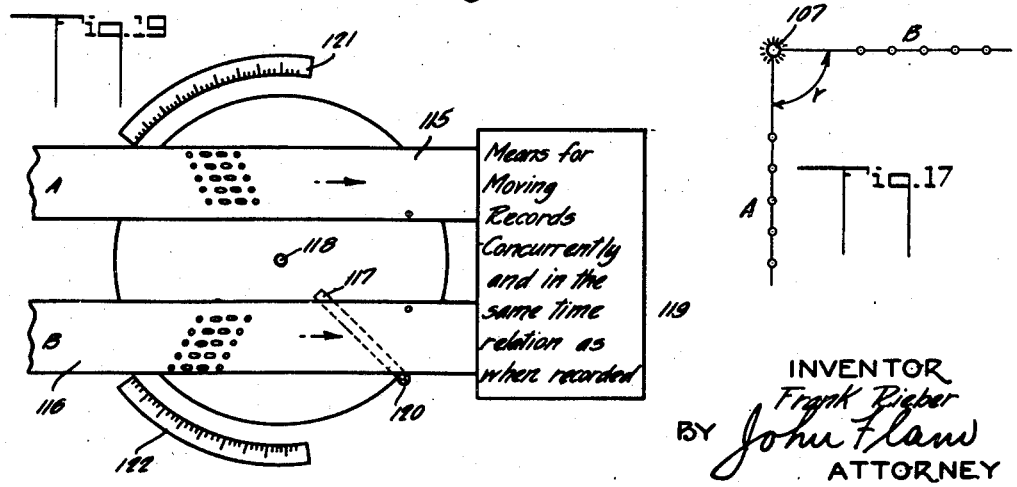
INVENTOR
Frank Rieber
BY John Flam
ATTORNEY Patented Sept. 16, 1947

2,427,421

UNITED STATES PATENT OFFICE 2,427,421

APPARATUS AND METHOD FOR MAKING AND ANALYZING GEOPHYSICAL RECORDS

Frank Rieber, Los Angeles, Calif.

Application June 22, 1940, Serial No. 341,893

15 Claims. (Cl. 33—1)

This invention relates to exploratory methods and apparatus, and particularly to those functioning by virtue of the detection of elastic waves.

Exploring methods of this general character have been known. They have been used for example in geophysical exploration for locating subterranean strata. Ordinarily provisions are made for artificially generating the waves through the earth, as by detonation of explosives, although the method in general is capable of use where the elastic waves are otherwise caused to be present.

A common form of systems heretofore known relies upon the reception of reflected waves from a surface or object to be located. It is practicable for example by appropriate well-known timing apparatus and receptor apparatus to measure the time interval elapsing between the instant of propagation and the instant of first arrival at the receptor. Knowing the velocity of propagation through the medium, the length of the path of the waves is known. Accordingly, it is possible to plot the locus of the point of reflection, by drawing an ellipse having foci corresponding to the point of propagation and the point of reception; this is apparent because of the fact the sum of the length of the lines from any point on the curve of an ellipse to the foci is a constant. This constant represents the time interval as heretofore defined.

In order to determine the angle of the reflecting surface, for making a definite determination, it is possible to utilize a series of spaced receptors instead of a single one. The time lag of first arrival between the receptors is then used as a basis for determining the direction of the reflected wave front. With these additional data, the location of the subterranean surface may be obtained. The process of determining the angle of the wave front in this manner has been described in prior patents issued to Frank Rieber, Nos. 2,144,812 and 2,155,507, dated respectively January 24, 1939, and April 25, 1939.

It is one of the objects of this invention to simplify the procedure involved; and particularly by causing the locus of the point of reflection to be a circle.

It is another object of this invention to provide a system of this character that can be utilized readily to locate a source of elastic waves.

The records of the arrivals of trains of waves, have been made by suitable galvanometer tracks or traces formed on a uniformly moving record strip, as on photographic film. It is another object of this invention to make it possible to obtain these records in other ways, and particularly on a magnetic strip. The strip can be caused to be magnetized in such manner that the transverse magnetism along the length of the record corresponds to the intensity of the impulses received at the receptors. One of the advantages of this form of records is that the record can be "wiped off" if desired, for repeated use. Since simultaneous recording is required for obtaining a plurality of traces from a plurality of receptors, it is highly advantageous to make the traces on a common magnetic strip, in such manner that the intensities of magnetism of the traces in a direction transverse to the motion of the strip, represent simultaneous responses of the receptors. It is another object of this invention to make it possible to utilize a relatively narrow record tape for a plurality of magnetic traces, of the order of eight or ten.

It may happen that the wave front to be detected is such that the normal to the front lies out of a vertical plane. It is another object of this invention to make it possible to determine the direction of this normal to the wave front even when it departs from the vertical, as may occur when the surface reflecting the wave front is located in any tilted plane.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a diagram illustrating the manner in which the primary traces may be recorded on a magnetic tape or strip;

Fig. 2 is an enlarged view, partly in section, of one of the magnetic recorders utilized in connection with the magnetic strip;

Fig. 3 is an enlarged sectional view taken substantially along the plane 3—3 of Fig. 2;

Fig. 4 is a diagrammatic view of an analyzer mechanism for obtaining secondary traces, the primary record strip being enlarged;

Fig. 5 is a fragmentary view of a series of secondary traces produced by the aid of the analyzer mechanism illustrated in Fig. 4;

Fig. 6 is an enlarged diagram illustrating the magnetic arm of the analyzer mechanism;

Fig. 7 is a fragmentary view illustrating the mode of cooperation of the analyzer mechanism with the primary traces;

Fig. 8 is a diagram illustrating the manner in which the angle of the wave front may be obtained, as well as the travel period of the waves;

Fig. 9 is a diagram illustrating the application of the system for the location of a source of elastic waves;

Figs. 14 and 15 are mainly diagrammatic views of still another form of analyzer;

Fig. 16 is a diagrammatic view of still another form of analyzer;

Fig. 17 is a plan view diagram illustrating the extension of a system to one in which the normal to the wave front does not fall in a vertical plane passing through the receptors and the point of propagation;

Fig. 18 is a diagram of the apparatus that may be utilized in conjunction with the system of Fig. 17; and Fig. 19 is a diagram of an analyzer utilized in connection with the system of Fig. 17.

Figure 10:
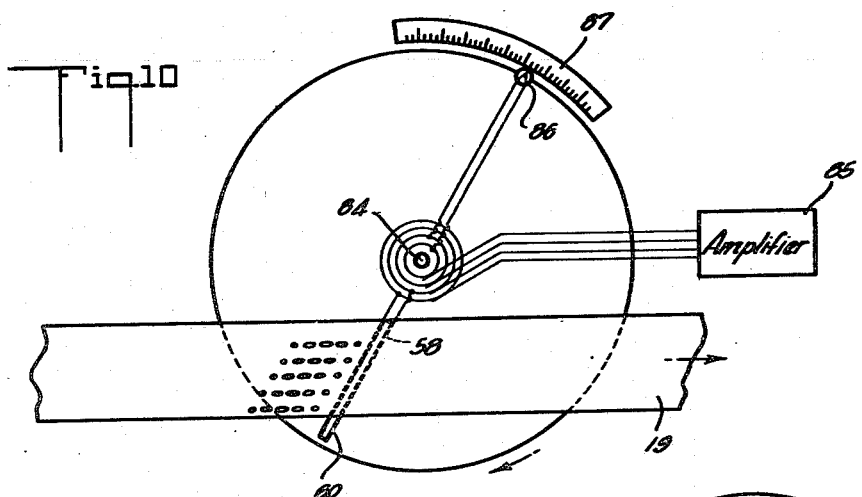
Figs. 10 and 11 are diagrams, similar to Fig. 4, of modified forms of analyzer.

Figure 1 illustrates a system applied to geophysical exploration, although as pointed out hereinbefore, it is as well adapted for the location of objects above, below or at the surface of the earth; or above, below or at the surface of a body of water. It is assumed that there is a subterranean interface 100 between strata below the earth's surface 1. A source of elastic waves 2 may be imbedded beneath the surface 1 and may be in the form of a charge of an explosive which may be detonated to generate elastic waves, progressing downwardly. A series of receptors 3, 4, 5, 6 and 7 are shown similarly arranged near the earth's surface 1, and in a common plane and colinear with the source 2. It is assumed in this instance that a vertical plane passing through the source 2 and receptors 3, 4, 5, 6 and 7 includes the normal to the reflecting face 100. The distances between the source and each of the receptors 3, 4, 5, 6 and 7 are known. Relatively these distances are quite short with respect to the subterranean interface 100, the location and dip or angle of which it is desired to determine. The depth of interface 100 is shown in the diagram as being much closer to the surface 1 than is ordinarily encountered. Thus this depth may be of the order of thousands of feet and the source 2 with receptors 3, 4, 5, 6 and 7 may be quite closely spaced, of the order of a hundred feet.

Assuming that interface 100 is thus disposed considerably below the earth's surface, it may be assumed that a wave front is reflected from this interface, substantially planar in form when the front arrives at the receptors 3, 4, 5, 6 and 7. Line 8 is drawn to represent a plane parallel to interface 100, and passing through source 2. The reflected individual wave trains 9, 10, 11, 12 and 13, forming the planar wave front reflected from the reflecting layer are normal to the interface 100 and therefore likewise normal to the parallel plane 8. The time taken between the instant of detonation at source 2 and the arrival of the wave front along the transverse plane represented by line 8, can be used to determine the distance from the source 2 along a normal to the reflecting plane. This is based upon an assumed velocity of propagation of the waves. If the time interval between the instant of propagation and the arrival of the reflected wave front to the position represented by plane 8 is T, and the velocity of propagation through the medium is represented by $v$, then the distance D along a normal to the reflecting surface 100 from the source 2 is obviously given by the formula $$\frac{T}{2} \times v$$

This normal distance being thus computable by measuring a time interval, it is necessary only to obtain the angle of the wave front as represented by the position of line 8, in order to locate the interface 100 correctly. With this angle known, this face 100 may be located as follows: a circle 101 is drawn from a point representing source 2, having a radius representing D to scale as computed above. Then a tangent line, having the determined angle of the wave front, drawn to the circle 101 represents the position of the interface.

The receptors 3, 4, 5, 6 and 7 are sensitive to the elastic wave impulses which reach them, and are used to determine the angle of the reflected wave front. They are shown as being connected to electrical translating devices 14, 15, 16, 17 and 18, by the aid of which the elastic wave impulses are translated into electrical current impulses. Although only five receptors are shown in the present instance, it is contemplated that many more such receptors may be utilized.

The electrical impulses thus produced are caused to effect magnetization of a magnetic tape or strip 19, shown in this instance as progressing over an idler roller 20. This magnetic strip 19 may be appropriately driven at any desired uniform rate, whereby longitudinal distances along the tape accurately represent time intervals.

The recording mechanism is illustrated most clearly in Figs. 2 and 3. Each of the translators 14, 15, 16, 17 and 18 may be connected to pass current impulses to an electromagnetic recorder, having a core presenting a recording polar face transversely to the tape or strip 19. This tape or strip 19 is made of such material that it readily may be cross-magnetized under the influence of the polar projections of the magnetic recorder, the intensity of the magnetization corresponding closely to the intensity of the received impulses.

One of the recording electromagnets such as 21, connected to receptor 3, is illustrated on an enlarged scale in Fig. 2. A pair of magnetic cores 22 and 23 are held on opposite sides of the strip 19. The central legs 24 and 25 of these cores 22 and 23 are illustrated in this instance as carrying the energizing coils 26 and 27 respectively, which may be fed in parallel from the translating device 14. Furthermore, these coils are so arranged that they assist each other for creating a magnetic flux through the center legs 24 and 25. These center legs are shown as having restricted polar areas in close position to the moving strip 19. Accordingly the flux density across the polar areas of the tips 28 and 29 is concentrated. These polar areas therefore represent the recording areas which produce magnetized areas 30 on the strip 19, in accordance with the received impulses. The intensities of magnetization of these areas correspond to the intensities of the impulses received respectively at the receptors. These magnetized areas are shown as having rounded ends, corresponding to the circular areas of the tips 28, 29.

In order to make it possible to space all the magnetic recorders 21, 42, 43, 44 and 45 closely side by side, the cores 22 and 23 are placed so as to provide non-recording polar faces in longitudinal alinement with the recorded polar faces. This is accomplished by having the outer legs of the cores 22 and 23 provided with polar faces 31, 32, 33, and 34 of much larger area than that of recording tips 28, 29; and they may be also spaced by a small air gap from the surface of the strip 19. In this way the magnetic density is very much less through the nonrecording polar faces 31, 32, 33 and 34, and consequently no material magnetization is effected thereby on the strip 19, by the polar faces 31, 32, 33 and 34. Thus the magnetic record is made solely by the action of the polar tips 28, 29. Yet this is accomplished without introducing a prohibitive reluctance into the magnetic circuit. And furthermore, the arrangement is compact, for the magnetic cores can be laid quite closely side by side as illustrated clearly in Fig. 1. In fact, this arrangement can be so well designed that the record strip 19 may be of the order of ½ inch in width, and yet accommodate 10 or 12 of the recording electromagnets. The parallel longitudinal magnetic records 37, 38, 39, 40 and 41 thus form primary traces. While definite areas 30 are assigned to the spots where magnetic records occur, it is of course understood that this is diagrammatic, and intended merely to show the variation in magnetic intensity longitudinally of the tape 19.

The instant when the elastic waves are propagated at source 2 may be recorded on the tape 19 by the aid of a similar magnetic recorder 35, placed in alinement with the recorders for the receptors 3, 4, 5, 6 and 7. If it be assumed that the tape 19 is traveling downwardly over the roller 20 as viewed in Fig. 1, the spot 36 on the tape may represent this instant of propagation, in advance of the reception of the waves as represented by the spots 30 at the receptors. The longitudinal distance along the tape 19 between spots 36 and the most intensely magnetized spot 30 of any of the magnetic traces 37, 38, 39, 40 and 41, represents accurately the time interval between the time of propagation and time of arrival of impulses at the corresponding receptor. To ensure this accuracy, the tape 19 must be driven at a very uniform rate, so that uniform increments of motion correspond to uniform time intervals.

By spacing the recording magnets 21, 42, 43, 44 and 45 in the same relative position to each other as the receptors 3—7, certain advantages are secured in analyzing the primary records 37—41. This may be explained most clearly in connection with Figs. 1, 4, 5 and 8.

In Fig. 8 only the end traces 37, 41 and the center trace 39 are shown for simplicity of explanation. The cross 46 on the timer trace produced by recorder 35 of Fig. 1, represents the timing impulse corresponding to the instant of propagation of the waves from source 2. The crosses 47, 48 and 49 represent respectively the intensest magnetizations produced on traces 37, 39 and 41, corresponding to the instants of arrival of the waves at the respective receptors 3, 5 and 7. It may be further assumed that line 50 represents the line along which the recording polar tips of all the recorders 35, 21, 42, 43, 44 and 45 fall, and that for the instant under consideration, the timer impulse 46 had already been recorded and is in the position shown relative to the recorders on line 50. A point 51 can represent to scale the position of source 2, the spacing along line 50 of the traces 37, 39, 41 thus corresponding to the relative position of the source 2 and of the series of receptors 3 to 7. This is obvious, since it has been heretofore stated that the parallel spacing of the primary traces 37 to 41 is to scale with respect to the spacing of these receptors.

For the instant illustrated in Fig. 8, records 47, 48 and 49 have not as yet been made, since they have not yet passed line 50. However, this instant is intended to represent the instant when the wave front reaches the plane represented by line 8 in Fig. 1; that is, the reflected wave front has just reached source 2. Accordingly the distance T of Fig. 8 between line 50 and the timer record 46 corresponds to the time taken for the wave front to proceed from source 2 back to plane 8. Accordingly point 49 on primary trace 41 corresponding to the maximum response of receptor 7 reaches the position of point 54 (representing the position of receptor 7) after a time interval of $\Delta T$. By that time, the time record 46 will have reached the point 55, spaced by $\Delta T$ from point 46. The time $\Delta T$ also represents the time taken for the wave front to travel from plane 8 of Fig. 1 by the distance 1 to the receptor 7. Similarly points 47 and 48 are also spaced back of the recording line 50 at the instant there represented, by intervals corresponding to the time taken for the wave front to travel from plane 8 to affect the receptors 3 and 5 respectively. Since the velocity of propagation is a constant, and since the spacing of traces 37, 39, 41 and of point 51 along line 50 are proportional to the spacing of the corresponding receptors 3, 5 and 7 and of the source 2, the points 51, 47, 48 and 49 fall along a common straight line 56.

It also follows that after the record is made, with points 46, 47, 48 and 49 actually recorded, the times T and $\Delta T$ can be determined by determining, by trial, the angular position of line 56. The manner in which this is found will be described hereinafter.

Knowing T, the distance D (Fig. 1) is readily computable in the manner hereinabove described. Knowing $\Delta T$, the distance 1 is immediately computable by the relation $1 = \Delta T \cdot v$, where $v$ as before, represents the velocity of propagation. Knowing 1, the sine of the angle of the wave front, as is apparent from Fig. 1, is given by the ratio of 1 to the distance between the source 2 and the end receptor 7. Thus the wave front angle is obtained.

A diagrammatic representation of an analyzer that can be used to determine T and $\Delta T$ to accomplish this result is illustrated in Figs. 4 and 6. In this instance the analyzer includes a bar 58 of magnetic material which may be angularly adjusted about a pivot pin 59. The spacing of the axis of pivot pin 59 in relation to the spaced traces 37, 38, 39, 40 and 41 is proportional to the spacing from the source 2 to the receptors 3, 4, 5, 6 and 7. Disposed around the bar is a coil 60. As the strip 19 is moved past the bar 58 toward the right, the variations of magnetism represented by the traces 37, 38, 39, 40 and 41 will induce an electromotive force within the coil 60. The current thus induced in the coil 60 represents the integration of the instantaneous magnetic impulses falling along the length of the bar 58 on the record strip 19. The angular position of the bar 58 may be varied in order to discover that one in which this integration is a maximum. To facilitate these trials, use is made of an adjusting worm 61 and a hand wheel 62 operating upon the worm wheel 63 attached to the bar 58. A stationary scale 64 may cooperate with a pointer 65 carried on the wheel 63 and may conveniently be calibrated directly to read $\Delta T$ of Fig. 8. For each setting of arm or bar 58 except when the indicator response is a maximum, the traces 37, 38, 39, 40 and 41 affect the coil 60 in succession, and not simultaneously. The time between the successive impulses is obviously a function of the angle made by bar 58 with respect to the travel of the strip 19. This time is represented by the distance on the strip, between successive impulses, and this distance varies in accordance with the angular position of bar 58. Thus by adjusting the bar, there is a corresponding time relation variation between the records on the strip.

The induced current in coil 60 may be fed to a galvanometer recorder mechanism 66 for providing a visual record of the intensity of the responses for each angular setting of the arm 58. This galvanometer recorder may be arranged so that its marking point 67 may trace in succession a series of side by side secondary records such as 68, 69, 70, 71, etc. (Fig. 5). Although only four such records are shown, any number of trials may be made to determine the correct angle "a" at which bar 58 serves to pick a maximum cumulative record. The secondary records may be formed upon a common record strip 72 advanced at a uniform rate past an idler roller 73. The mechanism driving the tape 19 and the secondary record strip 72 is such that they are moved in unison and without relative longitudinal displacement. In this way, the record strips can be run over and over again past the pickup and recording stations. Adjacent one edge of the strip 72 a timer trace 74 may be provided. This timer trace is obtained for a truly normal position of arms 58 with respect to the movement of tape 19. The timer trace shows the impulse 75 corresponding to the point 46 of Fig. 8.

After the timer trace 74 is obtained, trial angular settings of bar 58 are made, and the record rerun to trace the secondary records 68, 69, 70, 71, etc. One of the secondary traces 70, corresponding to angle "a" of Fig. 8, represents the greatest response, as indicated by the large amplitude impulse record 76 (Fig. 5). This record was thus obtained by such a setting of the bar 58 as corresponds to the falling of the maximum responses of the receptors 3—7 inclusive along the line 56 of Fig. 8. It is only for such setting that the magnetic records of the traces produce their greatest cumulative effect 76 on the bar 58. The longitudinal distance along timer trace 74 between the timer impulse 75 and the impulse 76, corresponds to the time T which it took for the waves to travel from the source 2 back to plane 8 (Fig. 1). Accordingly in this way not only is the inclination of the reflecting surface 100 obtained but its distance D along a normal from the source 2.

It is indicated clearly in Fig. 5 that each angular setting of the arm 58 varies the time interval from the time record 75 to the beginning of the impulse corresponding to the integrated magnetic effect of all of the traces. These variations in time intervals correspond to variations in the trial positions of the wave front plane 8 of Fig. 1. In other words, a trial setting of the angle of the arm 58 corresponds to a trial setting of the wave front plane 8 of Fig. 1. That trial setting is correct which causes maximum cumulative magnetic effect of the wave trains 9 to 13 inclusive, upon bar 58. The longitudinal distance between the timer trace impulse 75 and the impulse record 76 then corresponds to the time taken for the waves to travel from source 2 to the position represented by line 8 of Fig. 1. These time intervals may be accurately obtained by reference to the timer trace 74.

The cooperation of the magnetic bar 58 with the magnetized areas 30 is shown to best advantage in Fig. 7. The recording polar faces of the central legs 24 and 25 of the recording magnet being circular, the magnetized areas 30 are represented as areas having rounded ends. Irrespective of the angular positioning of the bar 58, these rounded ends produce the desired gradual sweep over of the magnetized areas with respect to the bar 58.

The system may be utilized for locating a distant source of electric waves. For example, in Fig. 9 such a source 77 is indicated. This may be a source of sound, or an explosion in the air, such as may be produced by detonation of an explosive at the point 77. A pair of sets of receptors 78 and 79 similar to the receptors described in connection with Fig. 1 may be set up so as to intercept the wave trains 80 and 81. By the methods described hereinbefore, the angles $e$ and $f$ of the wave fronts arriving at the sets of receptors may be determined by the aid of the primary records obtained by recorder mechanism 82, 83. These recorder mechanisms also record time intervals, to make it possible to determine the time $\Delta T$ as indicated in Fig. 8 and therefrom the angles $e$ and $f$ may be computed. Knowing the distance between the sets of receptors 78 and 79, it is a simple trigonometric problem to determine the point 77. However, a further check may be obtained by determining the difference in time interval between the arrival of the wave front at the receptors 79 and the arrival of the wave front at the receptors 78. This is represented in the diagram of Fig. 9 by the distance $g$.

The analyzer of Fig. 4 necessitates a manual adjustment of the arm or bar 58, by small increments, and a succession of secondary traces 68, 69, 70, 71 (Fig. 5) is obtained. The procedure may however be considerably simplified by constant rapid revolution of the arm, and causing cooperation of coil 60 with an instantaneous indicator, while the primary record strip 19 is moved slowly past the indicating station. One such form is illustrated in Fig. 10.

In this figure, the coil 60 and its supports including arm 58, is diagrammatically indicated as revolved rapidly about an axis 84, normal to the plane of strip 19. This axis corresponds in position to the source 2. The impulses produced in coil 60 are fed to amplifier 85, and the amplifier output is fed to neon lamp 86 carried by the support of coil 60. Appropriate collector rings and brushes may be provided to make these connections even when the coil 60 and lamp 86 are revolving about axis 84. Lamp 86 responds instantaneously to the integration of the impulses picked up from record strip 19, since it operates on the principle of a glow lamp that has a filling of a noble monatomic gas. Its intensest energization corresponds to the alinement of coil 60 with the primary traces; and this position of coil 60 may be read on a stationary scale 87. As coil 60 is revolved, strip 19 is fed very slowly past the indicating station; and this is continued until lamp 86 glows most brilliantly and for the briefest interval, in the course of its traverse across scale 87. The position of lamp 86 at that instant can be readily determined. It corresponds to the simultaneous maximum effect of all of the traces on coil 60.

Figure 12:
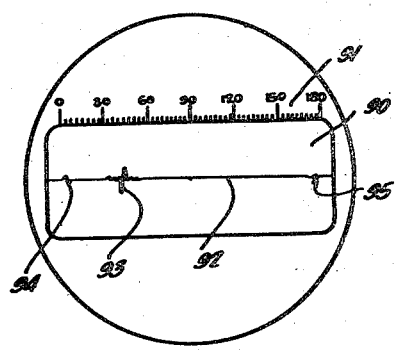
Figs. 12 and 13 are diagrams, illustrating the indicating means utilized in connection with the system of Fig. 11.
Figure 13:
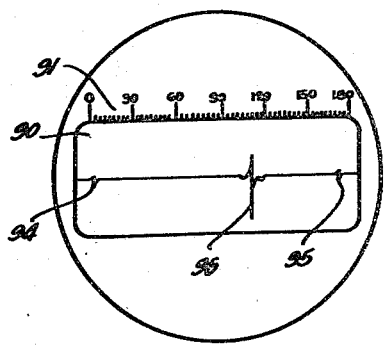
Figure 11:
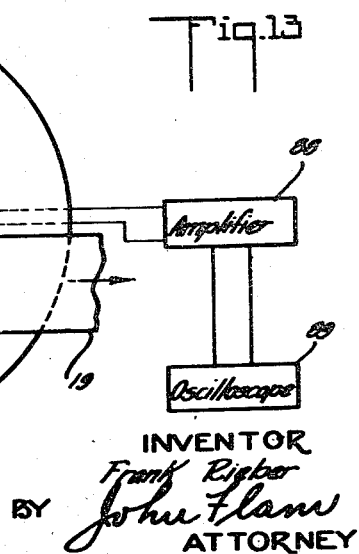

Instead of a neon indicating lamp 86, an oscilloscope may be utilized. This form is illustrated in Figs. 11, 12 and 13. Here the revolving coil 60 is shown as connected to an amplifier 88, the output of which affects the oscilloscope 89. The fluorescent screen 90 of the oscilloscope 89 is indicated in Figs. 12 and 13. At the top edge of the screen, a scale 91 may be provided, indicating angles of position of coil 60 from a fixed starting point. As record strip 19 is fed slowly past the revolving coil 60, the oscilloscope indicates the intensity and duration of the impulses fed to it from coil 60.

The oscillograph 92 of Fig. 12 is typical of one in which traces on tape 19 do not effect maximum response. For this position, the most intensely magnified spots of the primary traces 37, 38, 39, 40 and 41 are swept over by the arm 58 in succession, and not at a common instant. Accordingly the oscillograph produces the prolonged train of waves 93 of low amplitude. The waves 94 and 95 correspond respectively to the instants when the arm 58 first reaches a position over tape 19, and when it finally moves away from the tape 19 in the course of its revolution about axis 84. They may be aptly termed the entrance and exit transients; they remain in fixed position with respect to scale 91 and are not significant. There is no danger of any confusion between these transients and the significant train of waves 93.

When the glow lamp 86 or the oscilloscope is used, the amplifier system cooperating therewith may be so arranged that it causes energization of the lamp or oscilloscope only upon attainment of a definite peak voltage in coil 60.

In Fig. 13, the correct setting of tape 19 with respect to the indicating station is indicated. Here the significant wave train 96 has maximum amplitude and is of much shorter duration, corresponding to a position of tape 19 in which the arm 58 (in its revolution) picks up the maximum impulses at the same time from all of the primary traces 37, 38, 39, 40 and 41. The angular position of this maximum response may be read on such scale 91.

As the strip 19 is adjusted in position, the arm 58 sweeps over successive traces so that the relative time intervals between the maxima of each trace varies with the adjustment. For maximum integration, this time interval is reduced to zero.

It is sometimes desired to measure elapsed time only, as for example to determine the time T indicated on the diagram of Fig. 8, or generally, time between points of magnetic maxima on tape or strip 19. For this purpose the form of analyzer shown in Figs. 14 and 15 may be used. Here coil 60 is shown as carried on a pick-up arm 97 arranged radially to the axis 98. This axis is made to lie in a plane parallel to the surface of strip 19. A drum 99 of non-magnetic material may serve as a convenient support for the arm 97 and coil 60; and this drum may have its periphery in sliding contact with the strip 19. This strip may be guided on the rollers 105 and 106. The indicating means may take any of the forms hereinbefore described, such as the revolving neon lamp 103 and stationary scale 104.

If it be desired to angle the position of the arm 97 with respect to strip 19, and thereby measure increments of time as well as total time, the strip 19 may be made to be angularly adjustable with respect to the drum 99 as illustrated in Fig. 16. This can be accomplished for example by appropriate adjustment of the axis of rollers 105 and 106. The tape or strip 19 is sufficiently compliant to remain in proper contact over an appreciable portion of the drum area.

It has thus far been assumed that the vertical plane passing through the source 2 and receptors 3, 4, 5, 6 and 7 is normal to the reflecting surface 100; and that the dip of this surface is accurately determined by the angle at which the wave front arrives at the receptors. Such an angle however does not truly represent the dip in the event that this vertical plane is not normal to the reflecting surface. Under such circumstances the true angle of dip may be ascertained by the aid of the system illustrated in Figs. 17, 18 and 19.

In this system, the source 107 is associated with two sets of receptors A and B, arranged at an angle to each other, and each operating in exactly the same manner as the set 3, 4, 5, 6 and 7 of Fig. 1. Preferably the sets A and B are arranged at right angles to each other.

Assume that the wave front 108 (Fig. 18) from the reflecting surface 109 reaches such a position that it passes through source 107. The vertical planes passing through the sets of receptors A and B respectively intersect this wave front plane as indicated by the traces 110 and 111. The angles $\alpha$ and $\beta$ correspond to the angles that these traces make with the horizontal plane. Obviously if either of the vertical planes through set A or set B were normal to the wave front 108, then the dip of this front would be accurately shown by the corresponding angle $\alpha$ or $\beta$; and the trace on the other of the vertical planes would be horizontal. For the general case illustrated, neither of the angles $\alpha$ or $\beta$ is zero; but by determining them, the true dip and direction of dip may be calculated by usual methods.

The receptors A and B respond to determine these angles $\alpha$ and $\beta$ just as in the case already considered. As the wave front 108 proceeds from the reflecting surface 109, to the position of Fig. 18, maximum effects at the individual receptors of set A occur in timed intervals, corresponding to the linear distances of these receptors from the wave front trace 110. This situation similarly exists for the individual receptors of set B. In other words, as the front 108 moves upwardly from the position shown in Fig. 18, the individual receptors are caused to operate in timed sequence corresponding to the movement of the traces 110 and 111 upwardly past the receptors.

Recorder mechanisms 112 and 113 may be associated with each set of receptors, and may be arranged, as by the aid of mechanism 114, to operate to move the magnetic record strips 115 and 116 at a uniform synchronous rate.

Analysis of the records of strips 115 and 116 may be obtained by an oscilloscope or neon light, to determine the angles $\alpha$ and $\beta$. For example as illustrated in Fig. 19, a common scanning arm 117 may be arranged to be revolved about an axis 118 to sweep over the parallel record strips 115, 116. The axis 118 is spaced in relation to the records on strips 115, 116, to conform to the spacing of source 107 (Fig. 17) to the receptors. It may be assumed that the strips 115 and 116 are set in a definite position such that any line perpendicular to the direction of strip travel corresponds to the same instant of time on both of the records. When arm 117 is revolved, it will scan the record strips in rapid succession. Now as the strips are slowly moved past the revolving arm as by the mechanism 119, a maximum response may be noted of the neon lamp 120 or its equivalent when the strips 115, 116 are in such position that the arm 117 responds to the maximum integrations of the traces on the strips, as explained in connection with Figs. 10 or 11. The indications of maximum response may be rendered effective by the appropriately positioned scales 121, 122.

What is claimed is:

1. In an apparatus for making and analyzing geophysical records, a source of elastic waves and a plurality of receptors, arranged at predetermined distances along a common line, a record strip driven at a predetermined rate of speed, means for recording on said record strip a plurality of traces laterally spaced in proportion to the spacing between the receptors, means for recording on the record strip the time at which a pulse of elastic waves is generated at said wave source, and analyzing means cooperating with said plurality of traces, comprising a scanning member continuously rotated about an axis spaced laterally from said plurality of traces at a distance proportionate to the distance of said wave source from said receptors.

2. In an apparatus for making and analyzing geophysical records, a source of elastic waves and a plurality of receptors, arranged at predetermined distances along a common line, a record strip driven at a predetermined rate of speed, means for recording on said record strip a plurality of traces laterally spaced in proportion to the spacing between the receptors, means for recording on the record strip the time at which a pulse of elastic waves is generated at said wave source, analyzing means cooperating with said plurality of traces, comprising a scanning member continuously rotated about an axis spaced laterally from said plurality of traces at a distance proportionate to the distance of said wave source from said receptors, said scanning device being adapted to reproduce into a common electric circuit vibrations recorded on said plurality of traces or any of them, and an indicating device responsive to the magnitude of the vibrations in said common electric circuit and to the angular position of the said rotating scanning member.

3. The process of making and analyzing a geophysical record which comprises establishing along a common line, a shot point and a plurality of receptors, creating an elastic wave at the said shot point, receiving the resulting vibrations at the said receptors, recording on a separate trace the vibrations received by each receptor, the said traces being spaced transversely from one another by distances proportional to the spacings between the receptors, providing a rotatable scanning member pivoted about an axis whose lateral displacement from the recorded traces is proportional to the distance from the receptors to the shot point, the said rotatable scanning member being responsive to the summation of all the traces at the points where the said scanning member crosses the said traces, translating the output from the said scanning member through a magnitude indicating device responsive in one dimension to the sum of the magnitudes of the individual receptor traces crossed by the scanning device, and in the other dimension to the angular position of the scanning device.

4. The process of making and analyzing geophysical records, which comprises establishing along a common line a shot point and a plurality of receptors, and establishing along another common line passing through the said shot point at an angle to the first said line a second group of receptors, creating an elastic wave at the said shot point, receiving the resulting vibrations at the said receptors, recording on a common record strip separate traces corresponding to the individual receptors in the first group, recording on a second common record strip individual traces corresponding to the receptors in the second group, said traces being spaced transversely from one another on their respective record strips by distances proportional to the spacings between the receptors, providing a rotatable scanning member pivoted about an axis whose lateral displacement from the recorded traces on the first record strip is proportional to the distance from the shot point to the receptors in the first group, and whose lateral displacement from the recorded traces on the second strip is proportional to the distance from the shot point to the receptors of the second group, the said rotatable member being responsive to the summation of all the traces on one record strip at the point where the said scanning member crosses the said traces, and thereafter being responsive to all the traces on the second record strip at the points where the scanning member crosses the second group of traces, translating the output from the said scanning member through a magnitude indicating device responsive in one dimension to the sum of the magnitudes of the individual receptor traces crossed by the scanning device and in the other dimension to the angular position of the scanning device, and thereafter moving both record strips past said rotating scanning device, said record strips being maintained fixed in their longitudinal position with respect to each other, and observing the occurrence of maximum indications in the indicating device corresponding to the sweep of the scanning device over either record strip, and likewise observing the time displacement of the record strips with respect to the axis of the scanning device at the times when the said maxima are indicated.

5. An analyzer for a plurality of traces comprising means for simultaneously moving said traces in the direction of their extension, a scanning member, responsive to all of said traces, means to move said scanning member over said traces at a rapidly changing angle to said direction of extension, means to sum the instantaneous response to all of said traces of said scanning member, and indicating means to show said instantaneous sum.

6. An analyzer for a plurality of traces comprising means for simultaneously moving said traces in the direction of their extension, a scanning member, means to move said scanning member over said traces at a rapidly changing angle to said direction of extension, means to sum the instantaneous response of said scanning member to all of said traces, an index carried by said scanning means, and a stationary scale past which said index moves, and means operated by said summing means to indicate the instantaneous position of said index when said summing means is at its maximum.

7. An analyzer for a plurality of traces, each made by the responses of a receptor to a common source of disturbance which comprises means for simultaneously moving said traces in the direction of their extension, a scanning member pivoted to move about a point adjacent to and over said traces, said traces being spaced from each other and from said point in proportion to the spacing of said receptors from each other and from said source, means for moving said scanning member rapidly about said point, and means to sum the various instantaneous responses of said scanning member to said traces, and means to indicate the said summation, whereby all the different transients contained in said traces will be summed up in proper angular relation.

8. An analyzer for a plurality of traces, each made by the responses of a receptor to a common source of disturbance which comprises means for simultaneously moving said traces in the direction of their extension, a scanning member pivoted to move about a point adjacent to and over said traces, said traces being spaced from each other and from said point in proportion to the spacing of said receptors from each other and from said source, means for moving said scanning member rapidly about said point, and means to sum the various instantaneous responses of said scanning member to said traces, a stationary scale concentric about said point, an index upon said scanning member rotating therewith, and means operated by the summation for indicating the instantaneous position of said index when said summing means is at its maximum.

9. An analyzer for a plurality of traces each made by the response of spaced receptors to a common source of disturbance which comprises means for supporting said traces, a disc rotating over said traces about a pivot adjacent thereto, a member receptive to all said traces mounted radially upon said disc and adapted to be carried by said disc over said traces at a rapidly changing angle, means to sum the instantaneous response of said scanning member to said traces, and means to indicate the said summation.

10. An analyzer for a plurality of magnetic parallel traces, means for moving said traces longitudinally, a disc pivoted adjacent to said traces, a magnet member carried by said disc in position simultaneously to move over all of said traces, whereby said magnet member will respond to the sum of all of the instantaneous values of said traces, and indicating means operated by said magnet.

11. An analyzer for simultaneously analyzing a plurality of sets of traces having a common speed of progression which comprises means for simultaneously moving the traces of both of said sets simultaneously, parallel to each other in the direction of their extension, a common scanning member for all of said sets, means for supporting said scanning member to move it over all of said traces with a rapidly changing angle to the direction of their extension, and means for separately summing the response to all of said traces of each set, and means for separately indicating each of said sums.

12. An analyzer for simultaneously analyzing a plurality of sets of traces having a common speed of progression which comprises means for simultaneously moving of traces of both of said sets simultaneously parallel to each other in the direction of their extension, a common scanning member for all of said sets, means for supporting said scanning member to move it over all of said traces with a rapidly changing angle to the direction of their extension, a stationary scale adjacent to said scanning means, and an index on said scanning means movable over said scale as said scanning means is moved, and means associated with said index for indicating the moment of maximum response of said summing means to said traces.

13. An analyzer for simultaneously analyzing a plurality of sets of traces, each of said sets being made by the response of a plurality of receptors to a common source of disturbance, the receptors of one set extending at a different angle from said source than the receptors of the other set, means for simultaneously moving all of said traces in the direction of their extension at the same speed, a scanning member pivoted about a point adjacent to said traces, said traces of each set being spaced from each other and from said point in proportion to the spacing of said receptors from each other and from said point, means for moving said scanning member rapidly about said point, means to sum the instantaneous responses of said scanning member to the traces of each set, and means for indicating the said summations whereby different transients contained in said traces will be summed up in proper angular relation.

14. An analyzer for simultaneously analyzing a plurality of sets of traces, each of said sets being made by the response of a plurality of receptors to a common source of disturbance, the receptors of one set extending from a different angle from said source than the receptors of the other set, means for simultaneously moving all of said traces in the direction of their extension at the same speed, a scanning member pivoted about a point adjacent to said traces, said traces of each set being spaced from each other and from said point in proportion to the spacing of said receptors from each other and from said point, means for moving said scanning member rapidly about said point, means to sum the instantaneous responses of said scanning member to the traces of each set, a stationary scale concentric about said point, an index upon said scale, and means rotatable about said pivot, and means operated by said summing means for indicating the instantaneous position of said index when each of said summing means is at its maximum.

15. An analyzer for a plurality of sets of traces, an arm pivoted above said traces about an axis adjacent to them whereby said arm may swing above said traces, means for simultaneously moving the said traces of both of said sets simultaneously parallel to each other in the direction of their extension, a scanning member carried by said arm responsive to all of said traces, means to move said arm to carry said scanning member over all of said traces with a rapidly changing angle to the direction of their extension, and means for separately summing the responses to all of said traces of each group, and means for separately indicating each of said sums.

FRANK RIEBER.

REFERENCES CITED

The following references are of record in the file of this patent:

UNITED STATES PATENTS

| Number | Name | Date |
| --- | --- | --- |
| 1,672,495 | McCollum | June 5, 1928 |
| 1,850,909 | Bahney | Mar. 22, 1932 |
| 2,051,153 | Rieber | Aug. 18, 1936 |
| 2,117,365 | Salvatori et al. | May 17, 1938 |
| 2,144,812 | Rieber | Jan. 24, 1939 |
| 2,155,507 | Rieber | Apr. 25, 1939 |
| 2,210,770 | Muller-Ernesti | Aug. 6, 1940 |
| 2,213,246 | Heller | Sept. 3, 1940 |
| 2,213,631 | Heller et al. | Sept. 3, 1940 |
| 2,243,730 | Ellis | May 27, 1941 |
| 2,174,330 | Papello | Sept. 26, 1939 |
| 1,548,895 | Mertz | Aug. 11, 1925 |
| 2,209,929 | O'Neill | July 30, 1940 |
| 2,168,047 | Skellet | Aug. 1, 1939 |
| 2,245,286 | Marzocchi | June 10, 1941 |
| 2,170,751 | Gabrilovitch | Aug. 22, 1939 |